US007728244B2

(12) United States Patent
De Leo et al.

(10) Patent No.: US 7,728,244 B2
(45) Date of Patent: Jun. 1, 2010

(54) MAIL SORTING AND SEQUENCING SYSTEM

(75) Inventors: Guido De Leo, Genoa (IT); Cristiano Franzone, Genoa (IT)

(73) Assignee: Elsag SpA, Genoa (IT)

( * ) Notice: Subject to any disclaimer, the term of this patent is extended or adjusted under 35 U.S.C. 154(b) by 439 days.

(21) Appl. No.: 11/755,979

(22) Filed: May 31, 2007

(65) Prior Publication Data

US 2007/0226156 A1 Sep. 27, 2007

Related U.S. Application Data

(63) Continuation of application No. 10/897,407, filed on Jul. 23, 2004, now Pat. No. 7,235,756.

(51) Int. Cl.
*B07C 5/02* (2006.01)
*G06K 9/00* (2006.01)

(52) U.S. Cl. ...................... 209/583; 209/900; 209/584; 209/3.1

(58) Field of Classification Search ................. 209/3.1, 209/583, 584, 900; 198/350, 367.1
See application file for complete search history.

(56) References Cited

U.S. PATENT DOCUMENTS 4,244,672 A * 1/1981 Lund .......................... 198/350
4,310,276 A * 1/1982 Castagnoli ............... 198/367.1
5,115,918 A 5/1992 DeWitt et al.
5,362,040 A 11/1994 Midavaine et al.
7,138,596 B2 * 11/2006 Pippin et al. ................ 209/584
2003/0038065 A1 2/2003 Pippin et al.

FOREIGN PATENT DOCUMENTS

WO WO 01/10574 A1 2/2001

* cited by examiner

*Primary Examiner*—Gene Crawford
*Assistant Examiner*—Terrell H Matthews
(74) *Attorney, Agent, or Firm*—Berenato & White, LLC

(57) ABSTRACT

A mail sorting and sequencing system having a number of DPP units cooperating with one another to sort and sequence mail items of three different types of mail. Each DPP unit having: a conveyor system wherein a number of trucks travel along a path; at least three truck feed units communicating with the conveyor system and receiving mail items of a respective type of mail; at least one accumulating device cooperating with the conveyor system to receive mail items released individually by the trucks; and a buffer unit for housing groups of mail items from the accumulating device.

20 Claims, 12 Drawing Sheets

MAIL SORTING AND SEQUENCING SYSTEM

This is a Continuation Application of U.S. patent application Ser. No. 10/897,407 filed on Jul. 23, 2004 now U.S. Pat. No. 7,235,756 hereby incorporated herein by reference.

The present invention relates to a mail sorting and sequencing system.

SUMMARY OF THE INVENTION

It is an object of the present invention to provide a mail sorting and sequencing system that can be configured to even simultaneously process different types of mail, and in particular:

- a first type of mail comprising letters and postcards;
- a second type of mail comprising items larger than letters and postcards, e.g. enveloped documents, wrapped magazines, newspapers, etc.; and
- a third type of mail comprising items of such a size as to make automated processing difficult/impossible/unpractical.

According to the present invention, there is provided a mail sorting and sequencing system, characterized by comprising at least one DPP unit for forming groups of mail items and for sorting and sequencing mail items of at least one of the following types of mail: a first type of mail comprising letters and postcards; a second type of mail comprising FLAT mail items of dimensions larger than the corresponding dimensions of letters and postcards; and a third type of mail comprising OVERSIZED mail items whose characteristic dimensions make automated processing of the items difficult/impossible/unpractical; each DPP unit comprising: a conveyor system wherein a number of trucks travel along a path; at least one feed unit communicating with the conveyor system, said feed unit receiving mail items of a specific type of mail, and loading said mail items into the trucks; and at least one accumulating device cooperating with said conveyor system to receive mail items released by the trucks.

BRIEF DESCRIPTION OF THE DRAWINGS

A preferred, non-limiting embodiment of the invention will be described by way of example with reference to the accompanying drawings, in which.

DETAILED DESCRIPTION OF THE INVENTION

Figure 2:
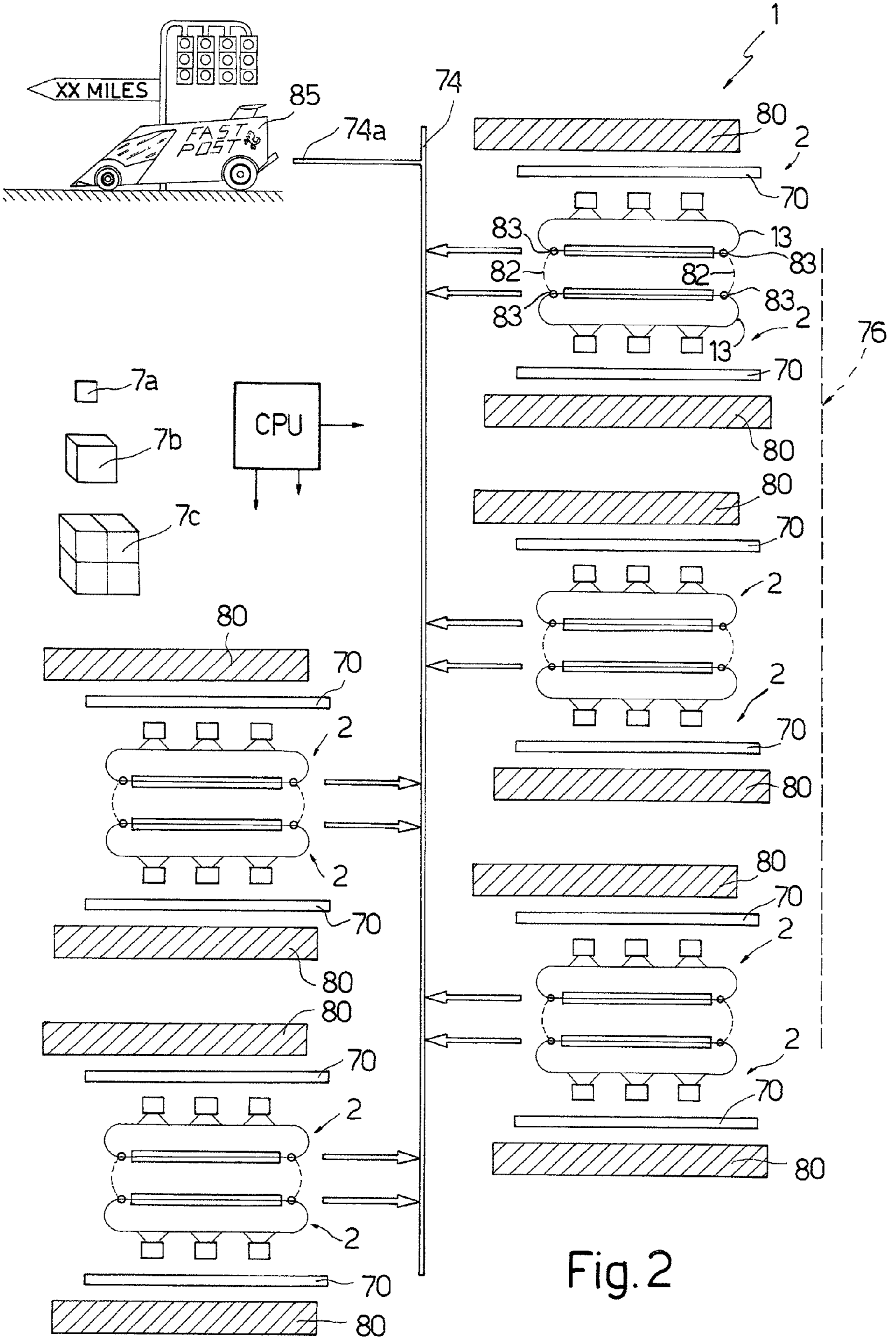
FIG. 2 shows, as a whole, the sorting and sequencing system according to the present invention for an average-size sorting depot.

Number 1 in FIG. 2 indicates as a whole a sorting and sequencing system in accordance with the present invention.

System 1 comprises a number of DPP (Delivery Point Package) units 2 for forming groups of mail items by delivery point, and which cooperate with one another to perform sorting and sequencing steps described in detail later on.

More specifically, system 1 provides for processing three types of mail items 7:

- a first type of mail comprising letters and postcards (REGULAR MAIL) 7*a;*
- a second type of mail comprising flat mail items (FLATS) 7*b* larger than letters and postcards, e.g. enveloped documents, wrapped magazines, newspapers, etc.; and
- a third type of mail (OVERSIZED) comprising mail items 7*c* whose characteristic dimensions make automated processing difficult/impossible/unpractical.

The system according to the present invention also processes REJECTED mail items with no or illegible postal codes.

More specifically, an OVERSIZED mail item has at least one characteristic dimension making pickup, conveyance, loading and separation of the item difficult/impossible/unpractical.

A mail item may also be classified as OVERSIZED when its weight exceeds a given limit, thus making pickup, conveyance, loading and separation of the item difficult/impossible/unpractical.

The Table below, for example, shows European maximum characteristic dimensions, over and above which a mail item is classified OVERSIZED.

| | |
|---|---|
| Thickness | 25 mm |
| Length | 380 mm |
| Height | 260 mm |
| Weight | 2 kg |

In other countries, e.g. the United States, different maximum characteristic dimensions may apply, e.g.:

| | |
|---|---|
| Thickness | 38 mm |
| Length | 410 mm |
| Height | 300 mm |
| Weight | 6 pounds |

A mail item may also be classified OVERSIZED when certain of its characteristic dimensions (e.g. thickness) vary widely, e.g. when the difference between the maximum and minimum thickness of the mail item exceeds a given limit (e.g. 50%).

Figure 1:
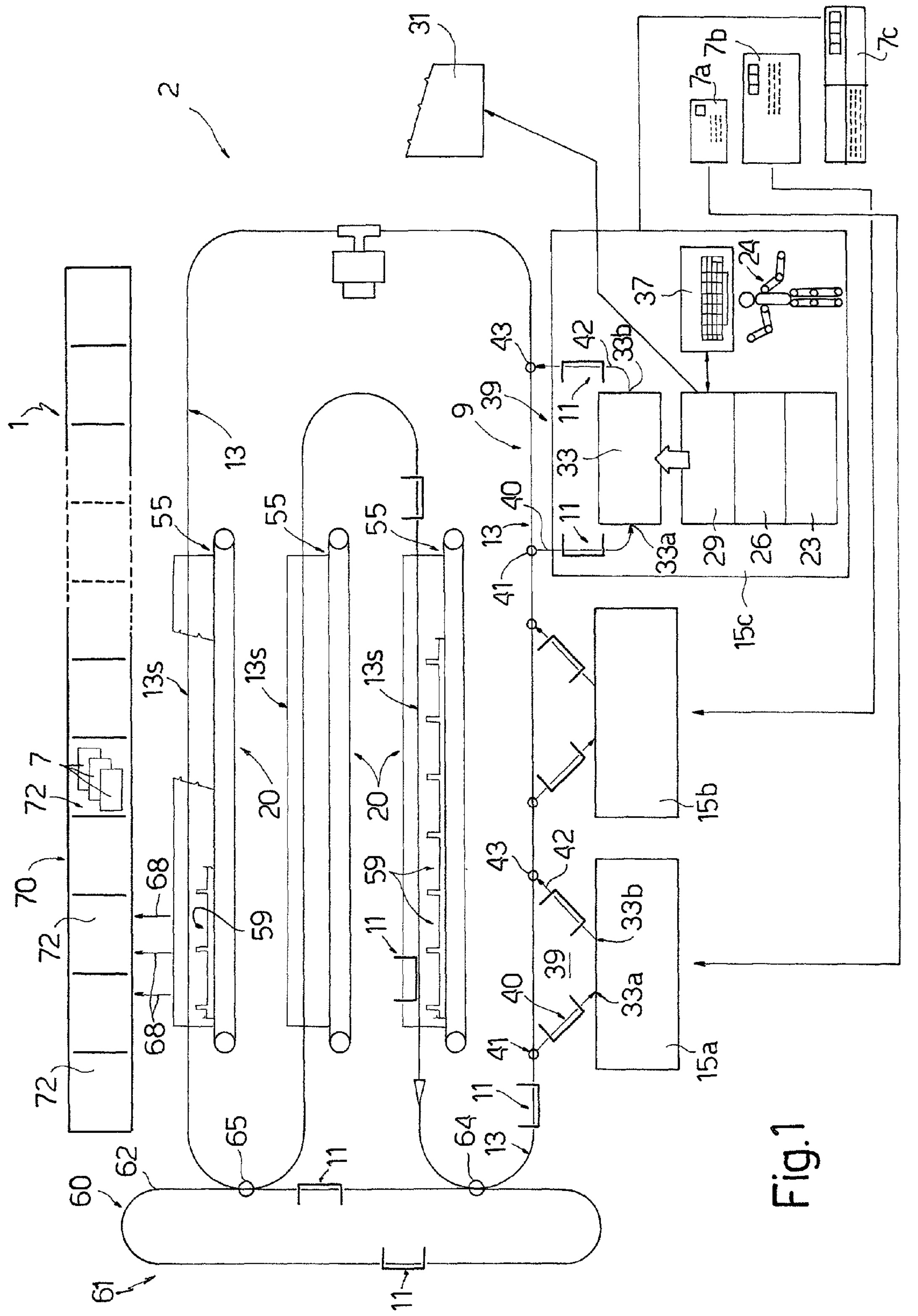
FIG. 1 shows, schematically, a unit forming part of the system according to the present invention.

The structure of a DPP unit 2 will be described with particular reference to FIG. 1.

A DDP unit 2 may comprise:

- a conveyor system 9 comprising a number of trucks 11 travelling along a path 13;
- three (or more) feed units 15*a*, 15*b*, 15*c* communicating with conveyor system 9, and each of which receives mail items 7 of a respective type of mail (REGULAR, FLAT, OVERSIZED, REJECTED) and loads mail items 7 into respective trucks 11; and at least one accumulating device 20 which cooperates with conveyor system 9 to receive mail items 7 released individually by trucks 11.

More specifically, each feed unit 15 comprises:

a known feeder 23, preferably employing knife belt technology, which receives mail items 7 loaded in batches, e.g. manually by an operator 24, and feeds them to a separator 26;

separator 26 which receives the batches of mail items 7 from feeder 23, and separates and feeds the items to a follow-up module; separator 26 (known) preferably separates the items in the batch using a friction—and vacuum-operated extractor belt;

a conveying and image pickup module 29 which receives the separated mail items 7, and acquires, of each mail item, a digital image $I_{mail}$ which is sent to a coding control system 31; conveying and image pickup module 29 (known) comprises a roller and belt conveyor system (not shown) for conveying individual mail items, and a digital camera and/or optical acquisition system (not shown) for acquiring image $I_{mail}$; and a truck interface device 33 (described in detail later on) which receives the separated mail items 7 from conveying and image pickup module 29, and loads them into trucks 11.

Conveying and image pickup module 29 may also be interfaced with a computerized unit 37, by which address code and sorting information is entered automatically (or manually by an operator 24, in the absence of postal codes) and made available to coding control system 31.

Each feed unit 15 and the conveyor system are interfaced by a loading area 39 comprising:

a feed portion 40 extending between a switch 41, along path 13, and an input 33*a* of truck interface device 33; and an unloading portion 42 extending between an output 33*b* of truck interface device 33 and a switch 43 located along path 13 and adjacent to switch 41.

More specifically, on reaching switch 41, a truck 11 travelling along path 13 is directed by switch 41 to truck interface device 33 along feed portion 40. Truck interface device 33 then loads mail items 7 into truck 11, which is then directed to unloading portion 42 and from there back onto path 13 by switch 43. Truck 11 travels at a slower speed in loading area 39 than along path 13.

More specifically, on reaching feed portion 40, truck 11 slows down and moves up to the truck 11 already being loaded. Eventually, truck 11 itself also begins loading and, as the mail items are being loaded, travels at a much slower constant speed, depending on the mail loading function. Once loaded, truck 11 moves on to unloading portion 42 and increases speed.

More specifically (FIG. 4), the conveyor system is defined by a monorail 44, along which each truck 11 is driven by an independent drive, and which has a substantially inverted-U-shaped section with two straight end flanges 44*f*.

Figure 4:
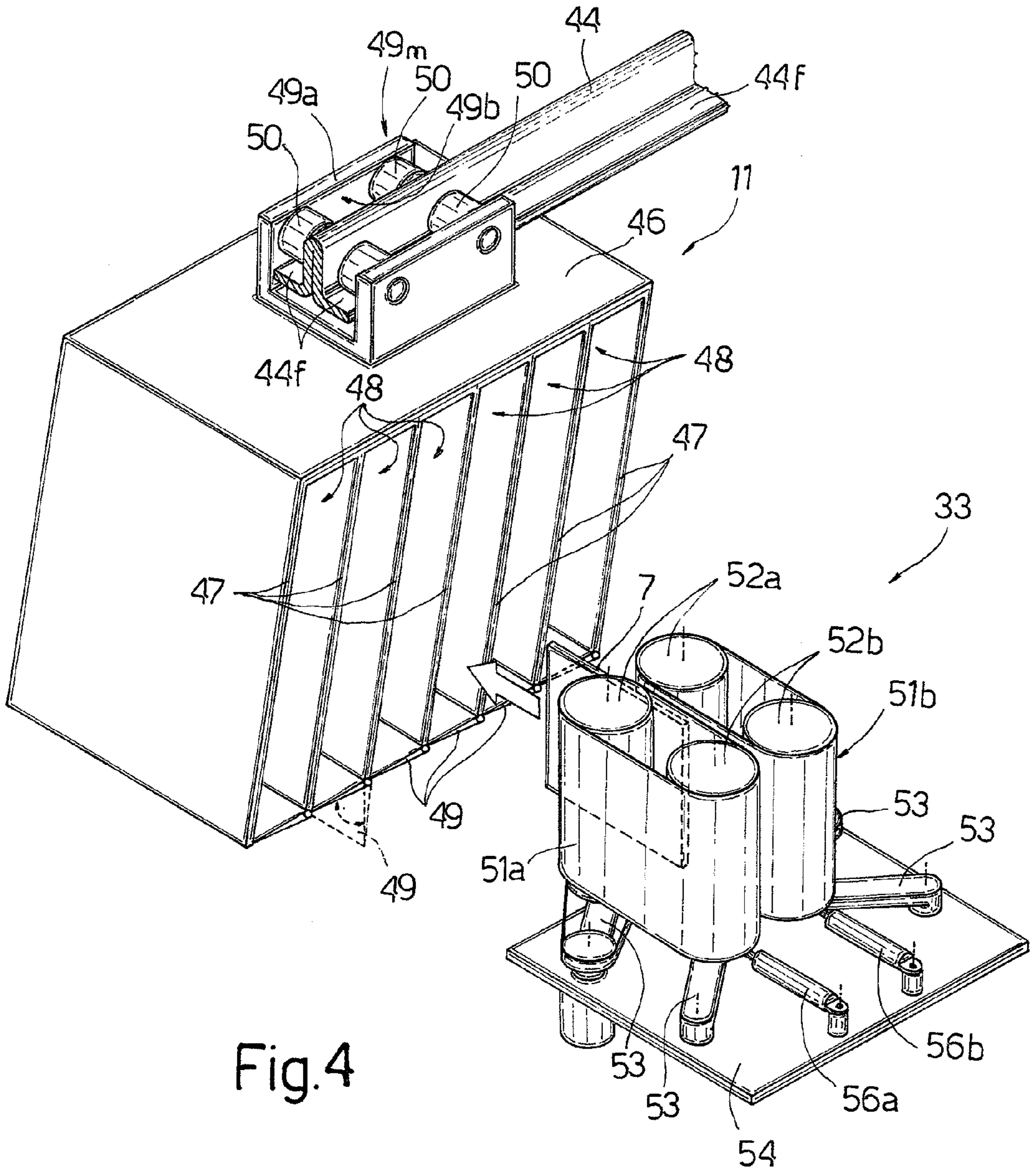
FIG. 4 shows a first mechanical detail of the system according to the present invention.

FIG. 4 shows one example of a truck 11, which is substantially parallelepiped-shaped, and comprises a flat rectangular top wall 46, from which extend a number of parallel, equally spaced, rectangular partitions 47 sloping with respect to flat wall 46. The space between each two adjacent partitions 47 defines a pocket 48, which is bounded at the top by wall 46, and at the bottom by a movable rectangular wall 49 defining an unloading hatch of pocket 48. More specifically, movable wall 49 is movable, under the control of actuating means (not shown), between a closed position (shown by the continuous line in FIG. 4) in which the major portions of movable wall 49 contact the bottom edges of adjacent partitions 47, and an open position (shown by the dash line in FIG. 4) in which movable wall 49 is substantially coplanar with one partition 47.

Pocket 48 is open on at least one side to permit insertion of mail items 7 into pocket 48. The other side (not shown) of pocket 48 may be closed to retain the mail items inserted forcefully inside the pocket, which houses mail items of different sizes.

Truck 11 comprises a drive 49*m* located on top wall 46 and comprising a parallelepiped-shaped body 49*a* defining a rectangular groove 49*b* in which monorail 44 extends. More specifically, two pairs of powered wheels 50 are fitted to opposite walls of the groove, and engage flanges 44*f* of monorail 44 to move truck 11 along monorail 44. Drive 49*m* comprises an electric motor (not shown) and a transmission (not shown) for transmitting power from the electric motor to wheels 50.

The trucks may be specially designed for particular types of mail, e.g. pockets 48 may differ in width and length to house different-sized mail items.

Truck interface device 33 comprises a conveyor system (not shown) for feeding individual mail items to a pair of powered belts 51*a*, 51*b* having respective parallel, facing, straight portions 51*f*, so that mail item 7 is inserted between belts 51*a*, 51*b* with its opposite faces contacting portions 51*f*.

More specifically, each belt 51*a*, 51*b* extends between two pulleys 52*a*, 52*b* fitted to first ends of respective arms 53 having second ends hinged to a supporting plate 54. Each of a pair of shock-absorbers 56*a*, 56*b* has a first end fixed to supporting plate 54, and a second end fixed to a respective arm 53, thus forming a parallelogram system which, by rotating arms 53, moves pulleys 52*a*, 52*b* to and from each other to adjust the gap between portions 51*f*.

More specifically, mail item 7 is positioned between belts 51*a*, 51*b* in a shoot position (FIG. 4) in which straight portions 51*f* contact opposite faces of the mail item. And, when the opening of a pocket 48 is positioned facing the mail item in the shoot position (as determined in known manner by sensors not shown), pulleys 52*a*, 52*b* (one pulley in each pair is powered) are rotated to shoot mail item 7 into pocket 48 (as shown by the arrow in FIG. 4).

Each accumulating device 20 comprises a straight conveyor belt 55 (FIG. 5) located beneath a straight unloading portion 13*s* of path 13.

Figure 5:
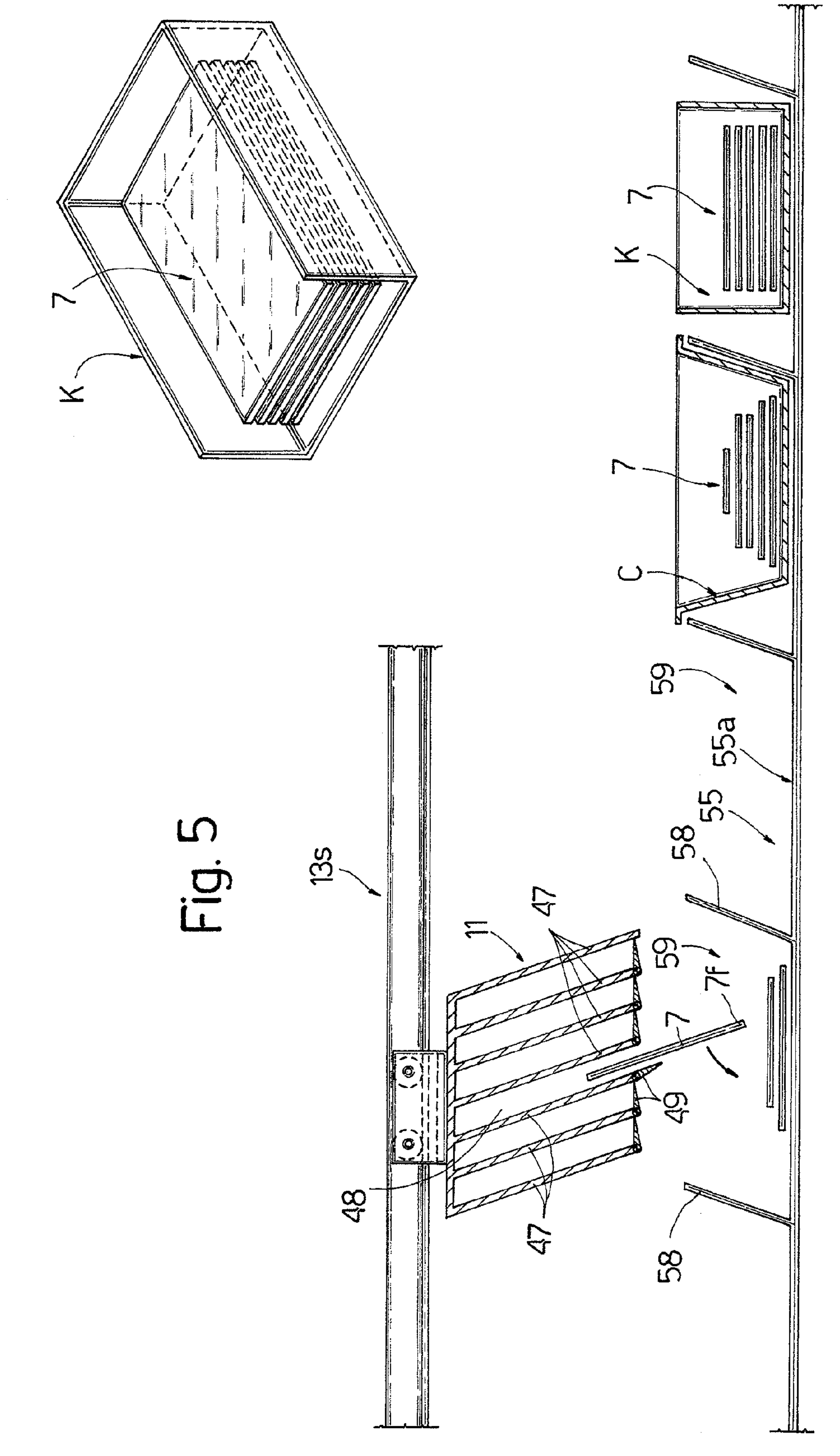
FIG. 5 shows a second mechanical detail of the system according to the present invention.
Figure 6:
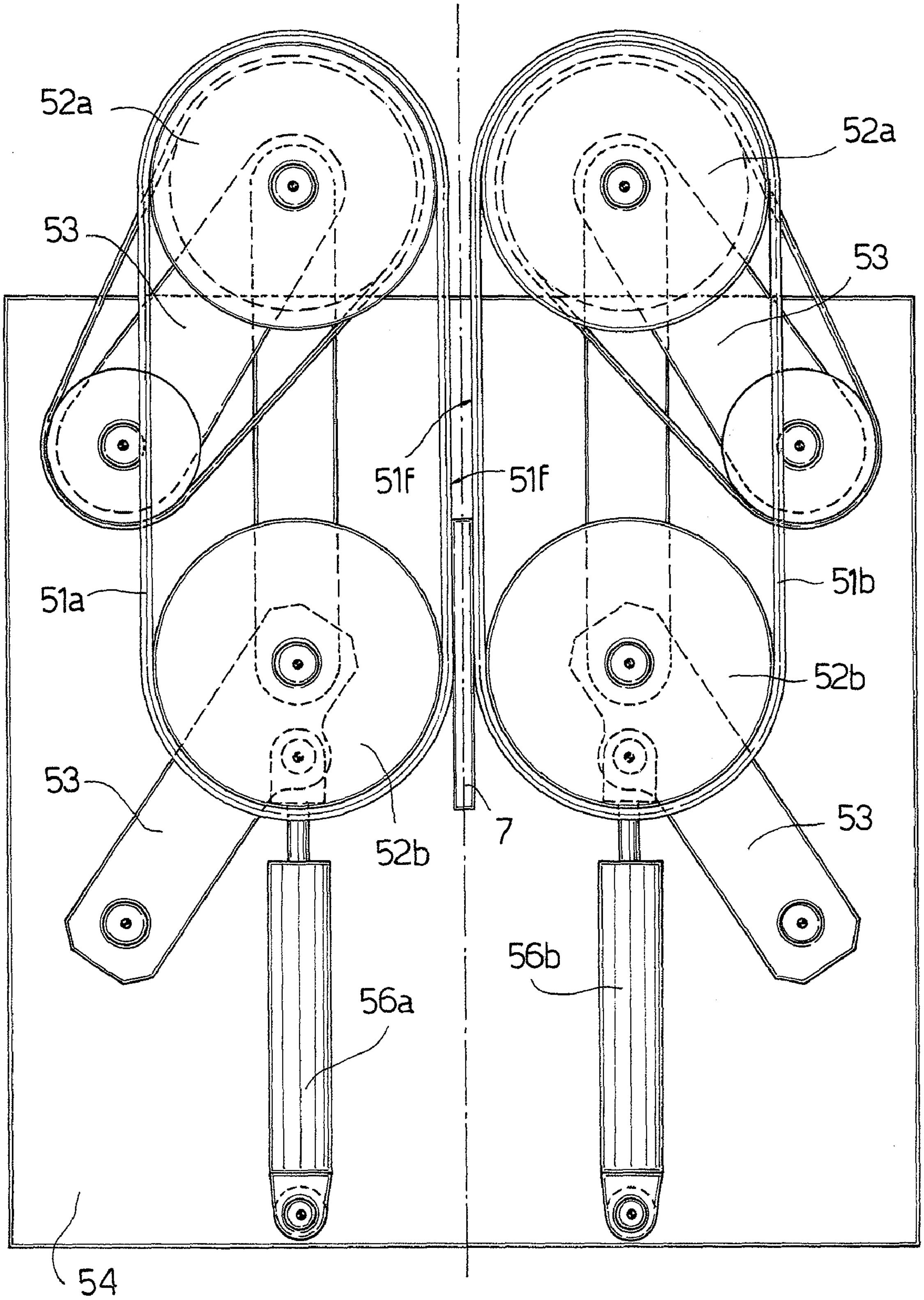
FIG. 6 shows a third mechanical detail of the system according to the present invention.

With particular reference to FIG. 5, conveyor belt 55 has a number of partitions 58 defining adjacent accumulating units 59 of belt 55, and which are preferably defined by flat rectangular walls equally spaced linearly along belt 55 and preferably sloping with respect to the flat surface 55*a* of conveyor belt 55.

To unload mail items 7 from truck 11 into accumulating device 20, truck 11 travels up to and engages straight unloading portion 13*s*, passing over an accumulating unit 59 of conveyor belt 55 which is stationary.

If a particular accumulating unit 59 is selected in advance, an unloading hatch 49 of truck 11 is opened, so that a single mail item 7 drops by force of gravity out of pocket 48 into the selected accumulating unit 59.

Partitions 47 (sloping with respect to the vertical) ensure mail item 7 slides out along a surface sloping with respect to the vertical, so that a front edge 7*f* (FIG. 5) of mail item 7 hits the bottom of accumulating unit 59, and the falling item rotates (as shown by the arrow in FIG. 5) into a position parallel to flat surface 55*a* of conveyor belt 55.

By repeating the above operations, a number of mail items are deposited inside accumulating units 59 to form groups of stacked mail items.

Unloading hatches 49 may be closed by a centralized system at a predetermined point along path 13, e.g. by means of a cam closing device (not shown).

Accumulating unit 59 (FIG. 5) may comprise a known removable bin C; in which case, mail items 7 form a stack inside the bin, and can be removed by removing bin C from accumulating unit 59.

Accumulating unit 59 (FIG. 5) may also comprise a known removable cartridge K enabling orderly arrangement of mail items 7 deposited successively inside the cartridge, and orderly, sequential removal of the mail items. A cartridge may be defined, for example, by a parallelepiped-shaped cardboard box open at the top and on one side; in which case, mail items 7 form a stack inside cartridge K, and can be removed by removing the cartridge from accumulating unit 59.

An intermediate parking area 60 (FIG. 1) may also be provided for parking trucks 11 not engaged in sorting and sequencing operations, and comprises a conveyor system 61 interfaced with conveyor system 9 and defining a path 62 (in particular, a secondary, e.g. endless, branch connected downstream to conveyor system 9) which communicates with path 13 via switches 64 and 65. Conveyor system 61 is conveniently defined by a monorail.

Accumulating units 59 of each DPP unit 2 communicate via a conveyor system 68 (shown schematically) with a buffer unit 70 having a number of cells 72 for storing groups of stacked mail items removed from accumulating units 59 (which are thus unloaded) and fed into cells 72.

Accumulating units 59 may also communicate with an unloading system 74 (FIG. 2) for feeding the stacked mail items, removed from accumulating units 59, out of DPP unit 2.

The accumulating units may also communicate with a conveyor system 76 (FIG. 2) for receiving stacked mail items removed from accumulating units 59 of one DPP unit and feeding them to other DPP units 2.

Each DPP unit 2 is coordinated with one or more known mail sorting and sequencing machines 80.

In actual use, at least one type of mail is processed inside each DPP unit. For example, FLATS 7*b* may be fed to feed unit 15*b*, which separates the incoming FLATS, codes them by means of module 29, and loads them into an empty truck 11 directed to unit 15 along feed portion 40.

Once loaded, truck 11 leaves feed unit 15, and is directed back onto path 13 along feed portion 42, and up to an accumulating device 20 where it is positioned over a selected accumulating unit 59.

At the same time, a selected unloading hatch 49 is opened, so that a mail item 7*b* slides by force of gravity into the selected accumulating unit.

Obviously, a number of unloading hatches 49 may be opened to unload a number of mail items into the same or different accumulating units 59. Repetition of the above operations for each accumulating unit 59 provides for feeding a number of mail items into different accumulating units 59.

Once unloading is completed, trucks 11 (by now empty) may be directed back to feed unit 15*b* to repeat the above operations. Any items not unloaded, on account of the relative output being unavailable at the time, may be unloaded at a surplus output, or by a further sorting round of the truck.

To implement sorting and sequencing system 1, DPP units 2 according to the present invention may be arranged as shown in FIG. 2, which, it is understood, shows a non-limiting embodiment, purely by way of example, of one possible type of architecture.

More specifically, two or more DPP units 2 are arranged adjacent to one another and connected so that the common paths 13 of two or more side by side DPP units communicate by means of connecting portions 82 selectable by switches 83. The FIG. 2 example shows five pairs of DPP units 2, which together form mail sorting and sequencing system 1.

The following is a description of the operations performed by mail sorting and sequencing system 1, and which are controlled by an electronic control unit CPU (FIG. 2) which supervises the operation of one or more DPP units 2.

More specifically, the sorting and sequencing process comprises three steps.

A first step. At this step, first DPP units 2 sort only a first type of mail. For example, the units 2*b* in a first and second pair of units only sort FLATS 7*b* fed to respective feed units 15*b*.

At the first step, second DPP units 2 sort only a second type of mail. For example, the units 2*c* in a third and fourth pair of units only sort OVERSIZED items 7*c* supplied to respective feed units 15*c*.

The DPP units 2 processing the FLATS and OVERSIZED items, and machines 80 may generate scan rejects, i.e. REJECTED mail items, which are conveniently fed back into the system, i.e. to DPP units 2.

More specifically, REJECTED items are fed to feed units 15*c* (the ones supplied with OVERSIZED items), by which the REJECTED items are appropriately coded and fed back into the cycle (RE-MECHANIZED). The "re-mechanized" REJECTED items are supplied to the FLAT-processing DPP units and therefore processed in the same way as FLATS.

Sorting by the first and second DPP units 2 at the first step is performed by mail areas, i.e. each accumulating unit 59 is loaded with mail for a given mail area having a given postal code. For example, a first accumulating unit 59 may be loaded with mail for a first urban area (e.g. central GENOA); a second accumulating unit 59 may be loaded with mail for a second urban area (e.g. Genoa Sestri); a third accumulating unit 59 may be loaded with mail for another city (e.g. Ventimiglia), and so on, so that groups of stacked mail items for different mail areas with respective postal codes are formed in the various accumulating units 59.

At the end of the first step, accumulating units 59 are unloaded. More specifically, the groups of mail items ("dispatch" items) for mail areas outside the system 1 area (for Ventimiglia, in the above example) are fed to unloading system 74, which directs them to other mail sorting and sequencing systems (not shown). For example, the groups of mail items removed from an output 74*a* of unloading system 74 may be loaded onto a van 85 and transported to other mail sorting and sequencing systems (not shown).

Conversely, the accumulating units 59 containing groups of mail items ("pre-sorted" items) for mail areas within the area covered by system 1 (in the above example, the various Genoa areas) are fed to common buffer units 70 by conveyor systems 68.

In the course of the above operations, known mail sorting and sequencing machines 80 sort letters 7*a* (REGULAR MAIL) in known manner.

A second step. At this step, the groups of mail items already stored in or still coming into common buffer units 70 or nearby areas are fed back into DPP units 2. More specifically, the groups of FLATS 7*b* for the same mail area are fed to feed units 15*b*. To these groups of items removed from common buffer units 70 may be added groups of like mail items (i.e. FLATS) from specified (major) users and already for the same mail areas.

Groups of further code-scan-generated REJECTED mail items 7*c* are fed to feed units 15*c*. To these groups of items removed from common buffer units 70 may be added groups of equivalent REJECTED mail items from specified (major) users and already for the same mail areas.

Figure 3:
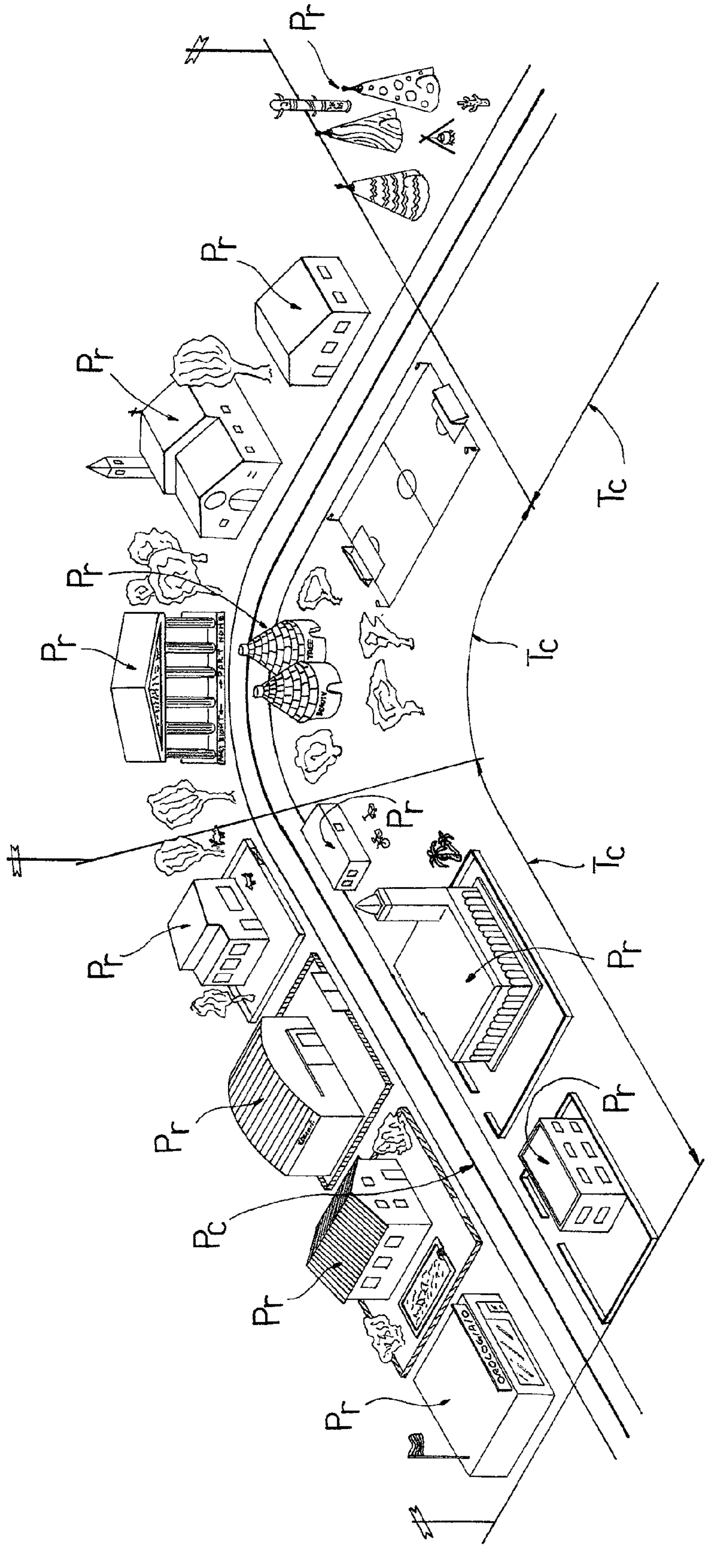
FIG. 3 shows one embodiment of a mail delivery operation based on the sorting performable by the system according to the present invention.

Sorting by the first and second DPP units 2 at the second step is performed on the basis of delivery sections Tc of a delivery route Pc covered by one or more postmen. That is, each accumulating unit 59 is loaded with mail to be delivered by a postman covering a delivery section Tc of a delivery route Pc (FIG. 3). As shown in FIG. 3, a postman's delivery route Pc comprises various adjacent, successive delivery sections Tc (the boundaries of delivery sections Tc are shown by flags); and each delivery section Tc comprises various delivery points Pr (e.g. semi-detached houses) to which the mail items are to be delivered.

At the end of the operations described above, groups of stacked mail items are transferred to common buffer unit 70, so that each cell 72 contains mail items (FLAT, REJECTED and RE-MECHANIZED) relative to the same delivery section Tc.

The above operations are then repeated for OVERSIZED mail items, so as to form, inside each accumulating unit 59, a group of OVERSIZED mail items for delivery by a postman covering a respective delivery section Tc.

In parallel with the above operations, sorting by known machines 80 is completed, so that mail items (REGULAR MAIL, i.e. letters or postcards), also divided by delivery sections Tc, are available at outputs (not shown) of machines 80.

By the end of the second step, groups of different types of mail (REGULAR, FLAT (and EE-MECHANIZED), REJECTED, OVERSIZED) are therefore available and stored (e.g. in buffer units 70), each group of mail being homogenous and comprising mail items relative to the same delivery section Tc.

A third step. As stated, each group of mail comprises mail items relative to the same delivery section Tc.

The groups of REGULAR, FLAT (and RE-MECHANIZED), OVERSIZED and REJECTED mail are now fed respectively to feed units 15*a*, 15*b*, 15*c* to activate the third step. Feed units 15*c* also receive any REJECTED mail items generated in the course of the process.

Figure 9:
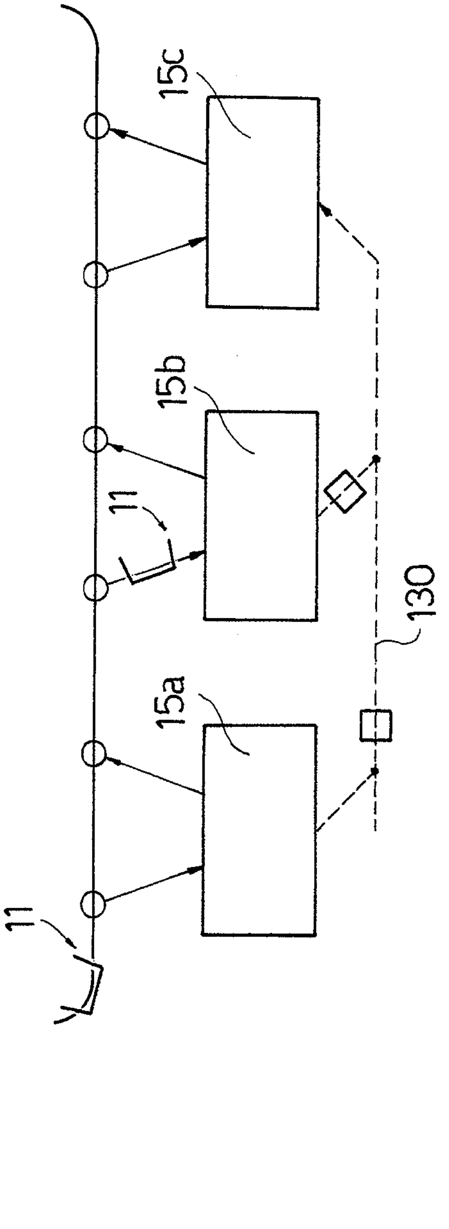
FIG. 9 shows a second variation of the system according to the present invention.

With particular reference to FIG. 9, this shows feed units 15*a*, 15*b*, 15*c*, which, as stated, feed trucks 11 with mail of the first type (REGULAR), second type (FLAT), and third type (OVERSIZED). REJECTED mail, however, may also be generated in feed units 15*a*, 15*b*, in the event conveying and image pickup module 29, together with computerized unit 37, is unable to pick up the code on the mail items. In which case, a dedicated conveyor system 130 may be provided to remove the REJECTED items from feed units 15*a*, 15*b* and transfer them at high speed to the input of unit 15*c*.

At the third step, each DPP unit simultaneously processes all three types of mail.

Sorting by DPP units 2 at the third step is performed by delivery points Pr, i.e. each accumulating unit 59 is loaded with mail of all three of the above types (REGULAR, FLAT (and RE-MECHANIZED), REJECTED & OVERSIZED) for delivery by a postman to a specific delivery point Pr.

Groups of different stacked mail items (REGULAR, FLAT (and RE-MECHANIZED), REJECTED & OVERSIZED) for delivery to various delivery points Pr are thus formed.

All the mail for a specific delivery section Tc forms a batch of mail items.

In the course of the third step, a batch of mail items is housed in a number of trucks travelling along path 13.

More specifically, each batch of mail items for a specific delivery section Tc is defined by a first batch comprising REGULAR MAIL, by a second batch comprising FLATS, and by a third batch comprising OVERSIZED & REJECTED mail.

More specifically, the trucks containing a batch of mail items travel along path 13 in the form a train of successive adjacent trucks; and the trucks in one train housing one batch of mail items are distanced, along path 13, from trucks forming another train and containing a different batch of mail items.

Figure 11:
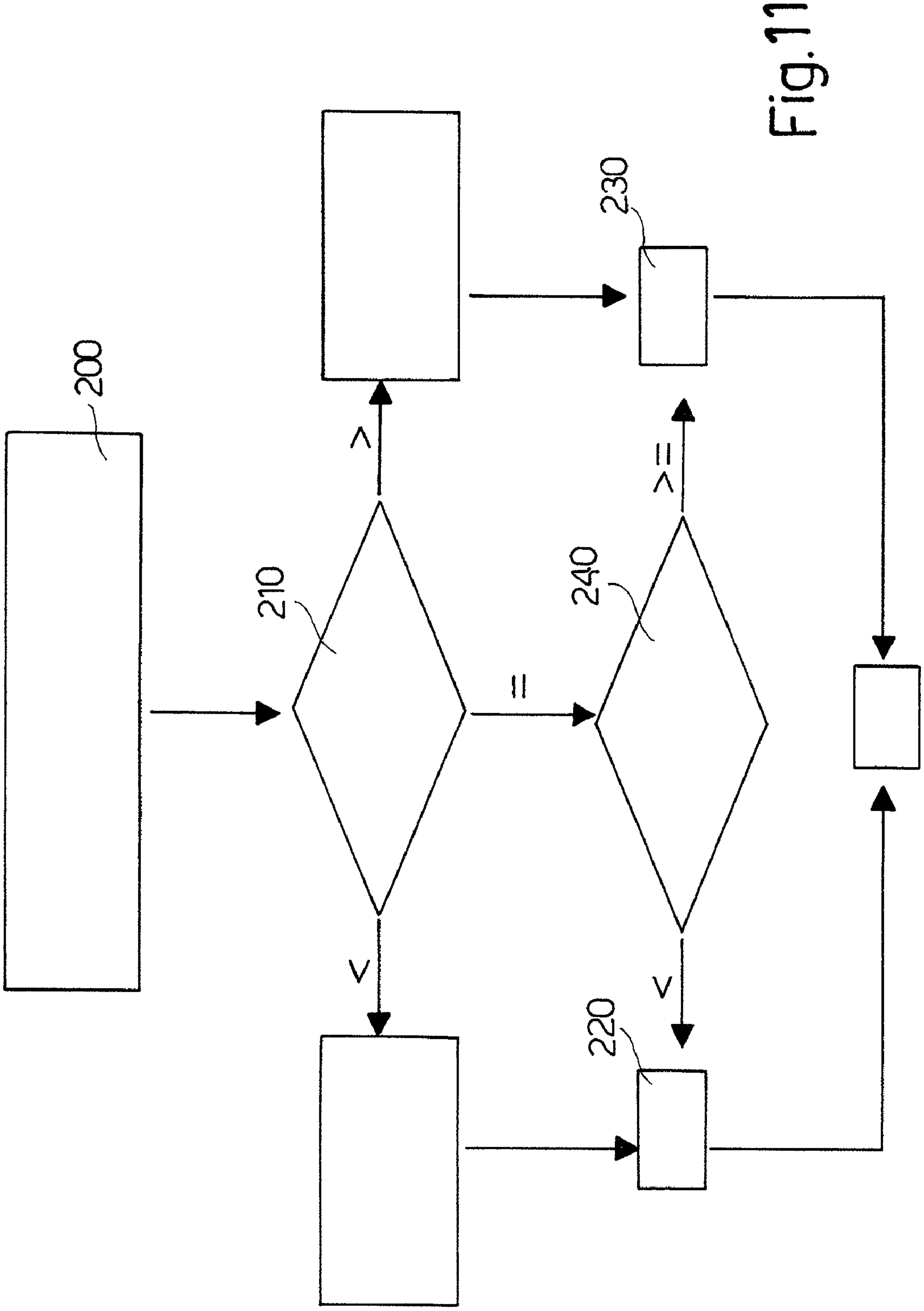
FIG. 11 shows a block diagram of a number of specific operations performed by the system according to the present invention.
Figures 12A, 12B:
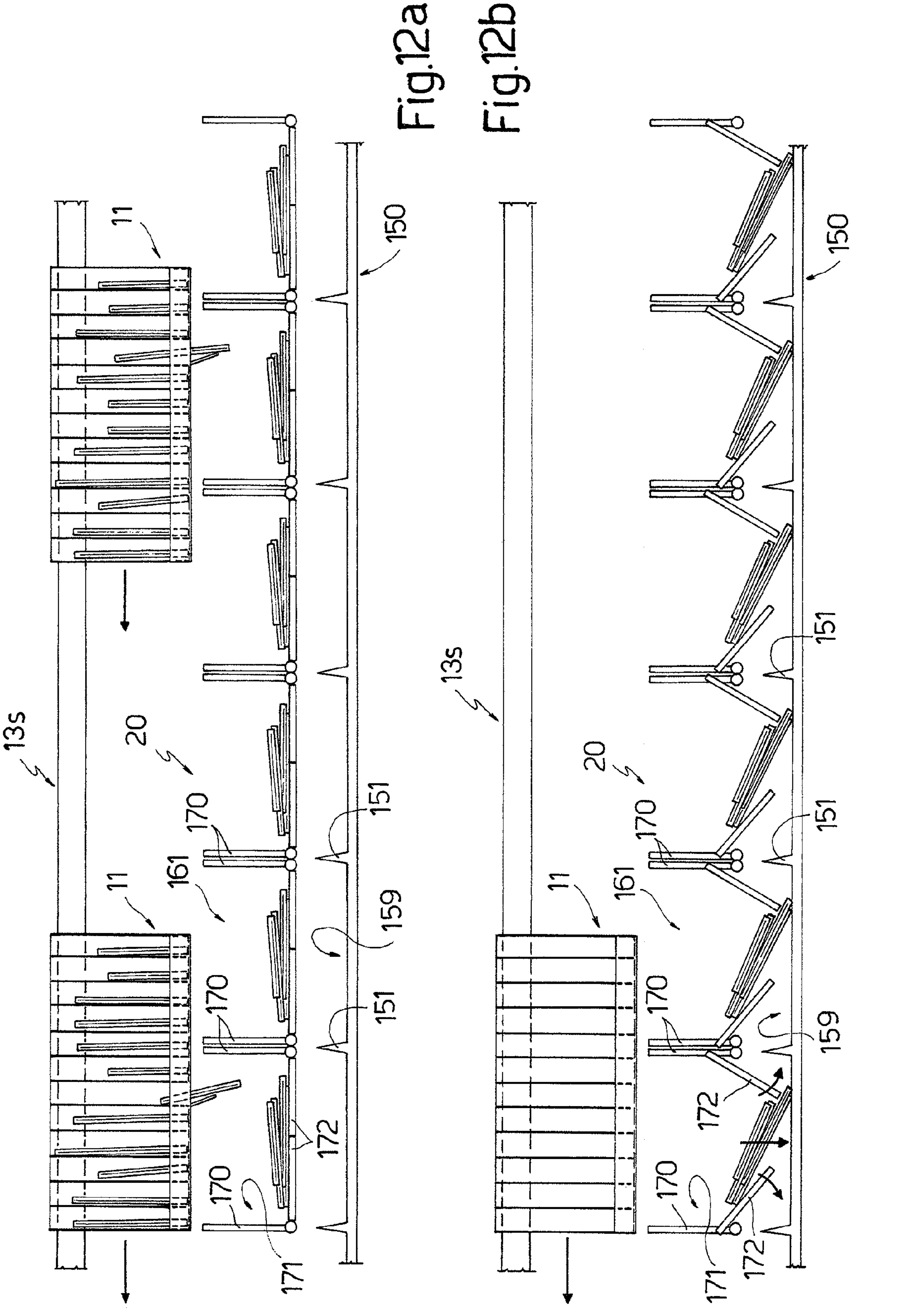
FIGS. 12*a*, 12*b*, 12*c* and 12*d* show a fourth variation of the system according to the present invention.
Figures 12C, 12D:
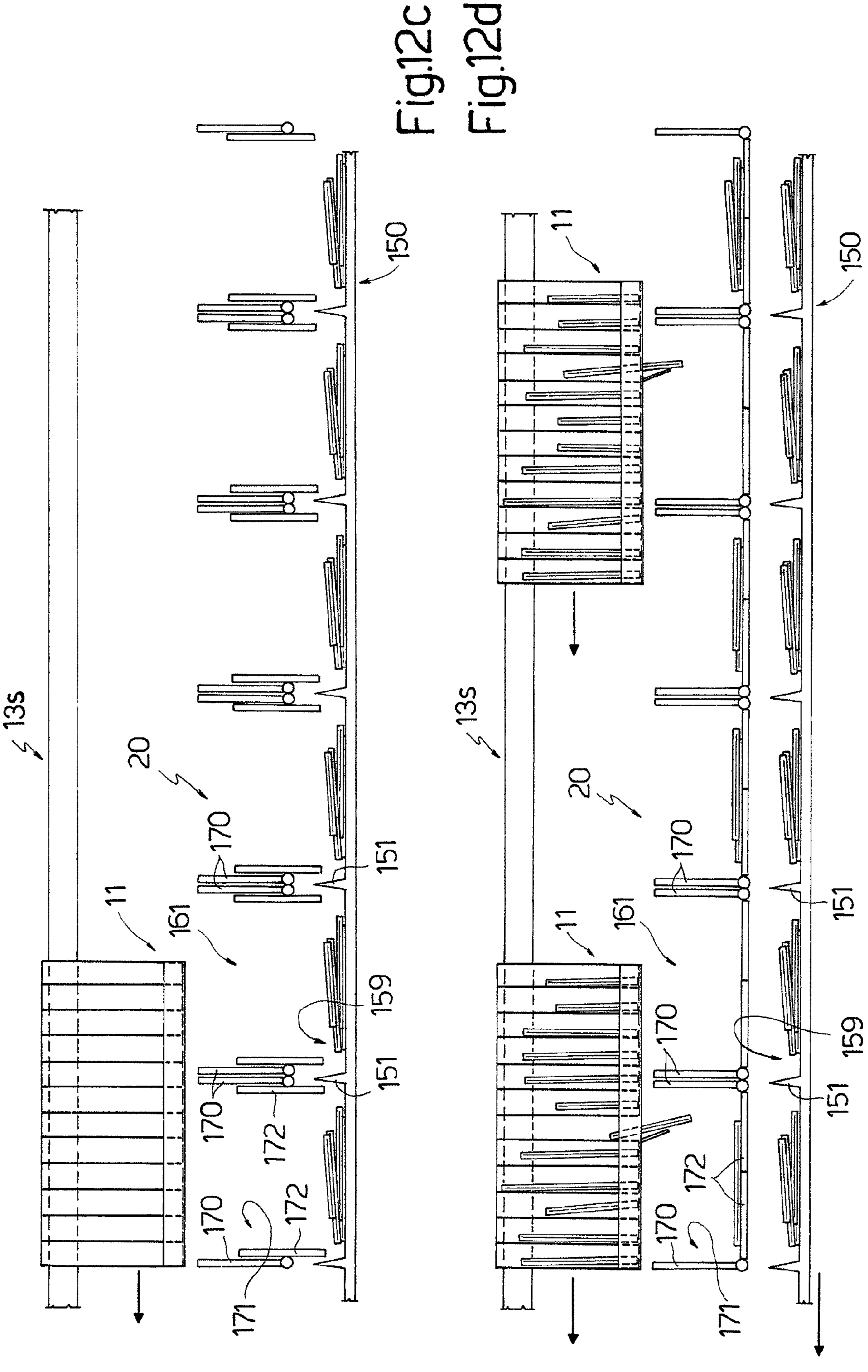

Train control may be performed as shown in FIG. 11.

More specifically, the FIG. 11 flow chart shows control of the switches (e.g. switch 43) located along path 13 and for directing trains from loading/unloading area 39 onto path 13. The trains directed onto path 13 must be prevented from colliding with existing trains travelling along path 13.

More specifically, each train is characterized by an identifier:

train(n,m) based on two parameters:

a first parameter n representing the progressive location of the mail batch along the delivery route; and a second parameter m representing the type of mail items in the batch.

The control logic comprises a first block 200, which checks the following event: different trains X and Y—including those being or yet to be formed—arrive at the same switch during the prosecution of their movement. When a number of trains (batches) X, Y are present along two branches, the relative parameter value is given by the train having greater precedence (minimum n, and, n being equal, minimum m).

Block 200 is followed by a block 210 which compares the first n parameters n(X) and n(Y) of the two trains, and activates the switch to let through the train containing the mail batch having the lower progressive location along delivery route Pc (blocks 220 and 230).

If two trains have the same n parameter value (i.e. contain different mail items but relative to the same delivery section), block 210 is followed by a block 240 which compares the m parameters m(X) and m(Y) of the two trains.

More specifically, block 240 activates the switch to let through the train containing the mail batch having the lower m parameter (blocks 220 and 230). Therefore, FLAT mail items (m=1) have precedence over REGULAR MAIL items (m=2), and REGULAR MAIL items have precedence over OVERSIZED & REJECTED mail items (m=3).

The operations shown in the FIG. 11 flow chart therefore:

let through mail batches on a priority basis, according to their location along the delivery route (batches for the start of the delivery route take priority over batches for the end of the delivery route); and first let through and permit loading into the accumulation units of FLATS, followed by REGULAR MAIL and OVERSIZED & REJECTED mail.

At the end of the third step, the groups of mail items formed as described above may be fed on conveyor belt 55 to a known packing device 100 (FIG. 7) for packing each group of mail items inside a container 101, in particular a flexible bag made of plastic material and formed by sealing two films 103, 104 of plastic material placed on opposite sides of the group of stacked mail items, so that each container corresponds to a given delivery point Pr.

In a preferred, non-limiting embodiment, packing device 100 forms groups of containers 101 joined to one another, so that each group of containers contains all the mail items (mail batch) for delivery along a respective delivery section Tc. Each container 101 may be joined to the adjacent containers by a plastic film having a pre-formed tear portion 107.

Figure 7:
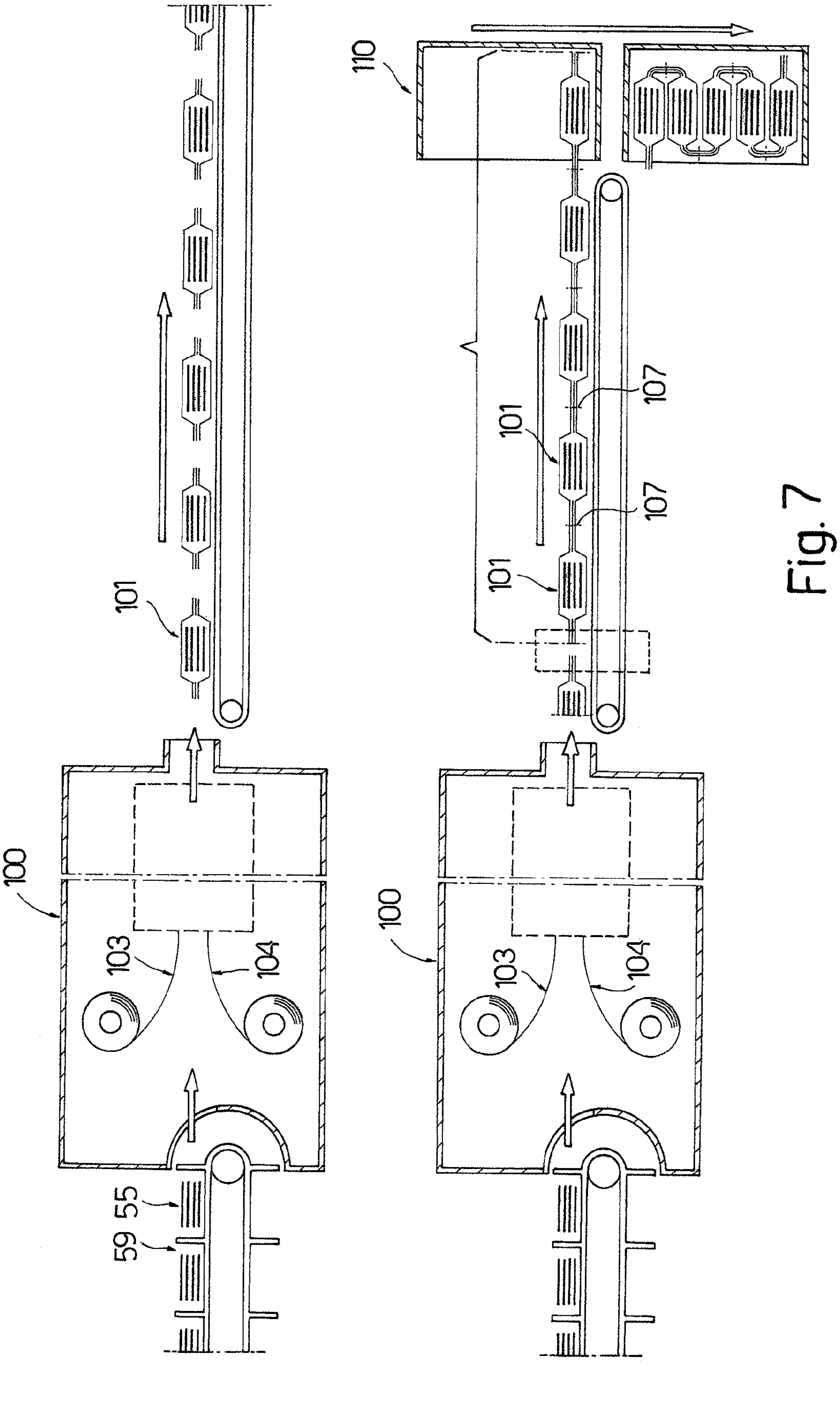
FIG. 7 shows a fourth mechanical detail of the system according to the present invention.

Each group of containers 101 may also be fed to a follow-up packing machine 110 for stacking containers 101, joined to one another or not by the plastic film, and for loading the stack of connected containers inside a delivery container (FIG. 7).

The advantages of the present invention are as follows.

The system according to the present invention provides for a significant increase in mail sorting and delivery efficiency.

With one output per delivery point, the system is capable of processing a wide range of mail items, from letters (REGULAR MAIL) to "irregular" (OVERSIZED) items that are difficult to mechanize.

The end product of the system according to the present invention is a number of groups of different types of mail items (REGULAR, FLAT, OVERSIZED & REJECTED) associated with one another (e.g. packed in the same container as described above), and which are issued to the postman arranged in order of delivery, which is thus reduced to one single delivery operation, with no further intervention required on the part of the postman.

The system is also mechanized, and provides for high capacity and a high degree of versatility.

Clearly, changes may be made to the sorting system as described and illustrated herein without, however, departing from the scope of the present invention.

In one variation of the present invention, each DDP unit comprises only two feed units 15 for receiving FLATS only.

In this variation, the first sorting step is performed in the same way as described above, i.e. by mail areas, and by loading each accumulating unit 59 with FLATS for a given mail area having a given number of postal codes. The first sorting step may also be performed by a known machine; in which case, the system according to the present invention performs only two steps.

Next (second step), each accumulating unit is loaded with FLATS having the same relative delivery location along different delivery sections of the same delivery route (or different delivery routes). That is, a first accumulating unit may be loaded with all FLATS for delivery to the first delivery point of different delivery sections; a second accumulating unit may be loaded with all FLATS for delivery to the second delivery point of different delivery sections; and an n-th accumulating unit may be loaded with all FLATS for delivery to the n-th delivery point of different delivery sections.

A third step is then performed, in which each accumulating unit 59 is loaded with mail items for the same delivery section and arranged in successive delivery points.

To perform the third step, the groups of mail items produced by the end of the second step (i.e. the mail items divided according to delivery location) are fed to respective feed units 15 (e.g. a first group comprising mail items for a first delivery location and withdrawn from a first output is fed to a first feed unit 15; a second group comprising mail items for a second delivery location and withdrawn from a second output is fed to a second feed unit 15; and so on).

The various mail batches are forwarded by a switch control system in the same way as described with reference to FIG. 11.

In this case, however, a batch is defined by FLATS having the same relative delivery location along different delivery sections.

The system is fully addressable in both steps, to a number of sequenced addresses equal to the number of outputs multiplied by the number of outputs. In this mode, addressability normally equals the number of outputs raised to the power of the number of sequencing steps, and is independent of the number of feed stations.

Figure 8:
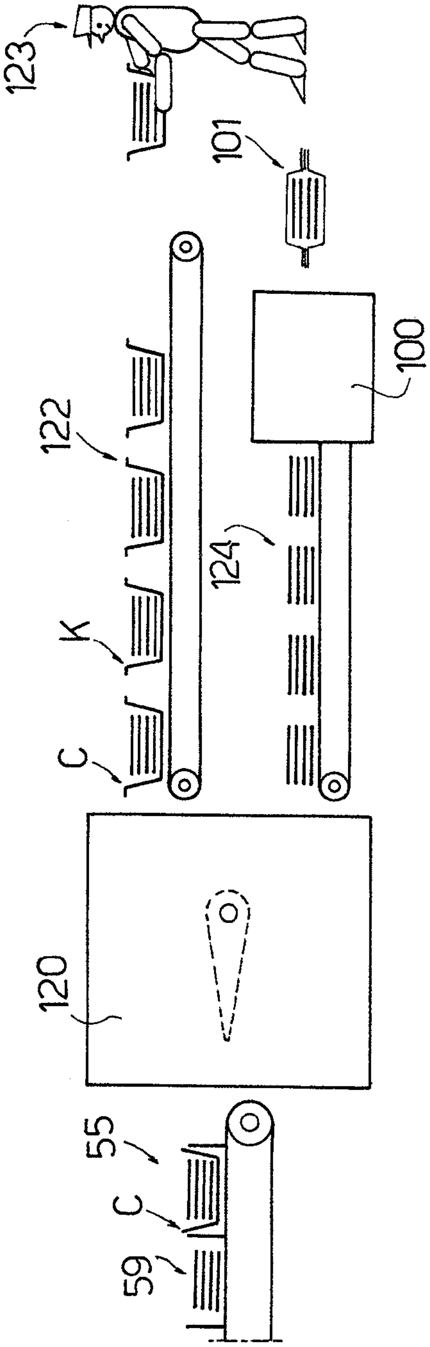
FIG. 8 shows a first variation of the system according to the present invention.

FIG. 8 shows a switch device 120 for unloading groups of mail items, e.g. at the end of the third step. As stated, mail items may be loaded directly into accumulating units 59 or into containers C or cartridges K. Switch device 120 receives the mail items unloaded off conveyor belt 55, and feeds the mail items contained inside containers C/cartridges K to a first belt conveyor system 122, which feeds them to an operator 123 for manually processing containers C/cartridges K.

Switch device 120 feeds the mail items housed directly inside accumulating units 59 to a second belt conveyor system 124, which feeds them to packing device 100.

Figure 10:
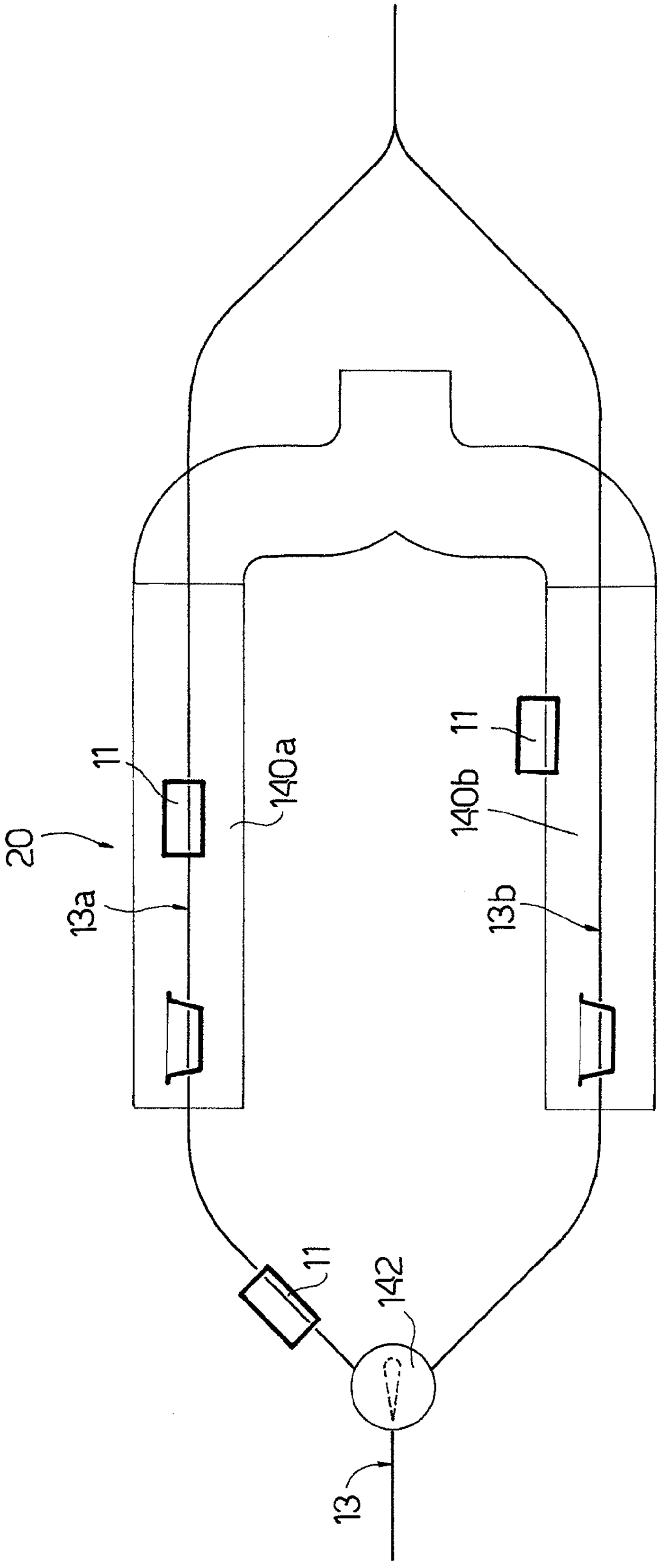
FIG. 10 shows a third variation of the system according to the present invention.

FIG. 10 shows a variation of accumulating device 20, for enabling extremely fast loading of the mail items.

In this variation, path 13 comprises a first unloading portion 13*a* located over a first conveyor belt 140*a*; and a second unloading portion 13*b* located over a second conveyor belt 140*b*.

The first and second unloading portions are selected by a selecting device 142 located along path 13; conveyor belts 140*a*, 140*b* preferably converge at a common unloading point; and portions 13*a*, 13*b* join up with path 13.

Mail items are unloaded into the accumulating device as follows:

The mail items are unloaded by trucks 11 over first conveyor belt 140*a* (which is stationary) to form first groups of mail items; and Second conveyor belt 140*b* is simultaneously moved to unload the groups of mail items already formed.

The above operations are subsequently inverted, so that:

The mail items are unloaded by trucks 11 over second conveyor belt 140*b* (which is stationary) to form second groups of mail items; and First conveyor belt 140*a* is simultaneously moved to unload the groups of mail items already formed.

FIGS. 12*a*, 12*b*, 12*c*, 12*d* show a variation of accumulating device 20.

More specifically, accumulating device 20 in FIGS. 12*a*, 12*b*, 12*c*, 12*d* comprises:

a conveyor belt 150 located beneath unloading portion 13*s* and having a number of partitions 151 defining adjacent accumulating units 159 along belt 150; and a number of trap units 161 located between conveyor belt 150 and unloading portion 13*s*, and for receiving the mail items unloaded by force of gravity from trucks 11.

More specifically, each trap unit 161 is movable between a closed position, in which it retains the mail items unloaded into it by truck 11, and an unloading position, in which the mail items inside trap unit 161 are released by trap unit 161 into a respective accumulating unit 159.

More specifically, each trap unit comprises vertical walls 170 defining a seat 171 bounded at the bottom by two rotary walls 172 hinged to bottom portions of walls 170. Walls 172 are movable, under the control of actuating means (not shown), between a closed position, in which walls 172 are coplanar with each other and perpendicular to walls 170 to close a bottom opening in seat 171 facing an accumulating unit 159 underneath, and an open position, in which walls 172 slope with respect to walls 170 to open the bottom opening in seat 171 facing an accumulating unit 159 underneath.

In actual use, the accumulating device performs the following operations:

at the sorting step (FIG. 12*a*), trap units 161 are closed, and the mail items are unloaded into trap units 161;

at the end of the sorting step (FIG. 12*b*), trap units 161 are opened, and the mail items accumulated inside each trap unit 161 is released into a respective accumulating unit 159 on conveyor belt 150;

different groups of mail items (FIG. 12*c*) are thus kept separate on conveyor belt 150, which is then moved to unload the groups of mail items from the various accumulating units 159; and once the groups of mail items are unloaded by conveyor belt 150 (FIG. 12*d*), trap units 161 are closed to start another cycle.

A container C or cartridge K may be placed inside one or more accumulating units 159, on conveyor belt 150; in which case, trap units 161 are preferably kept open.

The invention claimed is:

1. A mail sorting and sequencing system, comprising at least one DPP unit for forming groups of mail items and for sorting and sequencing mail items of the following types of mail:

a first type of mail items; and a second type of mail items substantially more difficult to process than said first type of mail items;

said at least one DPP unit comprising:

a first conveyor system a number of trucks travelling along a path;

at least one feed unit communicating with said first conveyor system, said feed unit receiving one of said first and second type of said mail items and loading one of said first and second type of said mail items into said trucks; and at least one accumulating device cooperating with said first conveyor system to receive one of said first and second type of said mail items released by said trucks;

said accumulating device comprises a second conveyor system located beneath an unloading portion of said path of said first conveyor system;

one of said trucks engages said unloading portion to run over said accumulating device; and said one truck has an unloading mechanism enabling release of one of said first and second type of said mail items from said one of said trucks and wherein each of said trucks defines a number of pockets each of which communicates externally of said truck through at least one loading opening and is bounded thereof by an unloading hatch movable between a closed position and an open position enabling said mail items to slide by force of gravity out of said pockets.

2. The system as defined in claim 1, wherein each of said pockets is bounded by two parallel walls sloping with respect to a vertical.

3. The system as defined in claim 1, wherein said DPP unit comprises at least two feed units communicating with said first conveyor system; each feed unit receiving mail items of a respective type of mail and loading said mail items into respective trucks.

4. The system as defined in claim 1, further comprising a buffer unit for containing groups of mail items at least partly from said accumulating device.

5. The system as defined in claim 1, wherein said at least one feed unit comprises:

a feeder receiving said mail items loaded in batches;

a separator receiving said batches of said mail items from said feeder;

a conveying and image pickup module which receives said separated mail items and acquires a digital image $I_{mail}$ of each said mail items; and a truck interface device which receives said separated mail items from said conveying and image pickup module and loads said mail items into said truck.

6. The system as defined in claim 1, wherein said feed unit and said first conveyor system are interfaced by a loading area comprising:

a feed portion extending between a first switch located along said path and an input of a truck interface device for loading said mail items into said truck; and an unloading portion extending between an output of said truck interface device and a second switch located along said path.

7. A system as claimed in claim 5, wherein a truck engaging said feed portion is slowed down to move said truck up to a further truck being loaded; said truck travelling at reduced speed when being loaded; and said truck engaging said unloading portion at increasing speed.

8. The system as defined in claim 1, wherein said first conveyor system comprises a monorail along which travel said trucks.

9. The system as defined in claim 8, wherein each of said trucks has an independent drive for moving said truck along said monorail.

10. The system as defined in claim 1, wherein said second conveyor system is a belt conveyor system.

11. The system as defined in claim 1, wherein said second conveyor system of said accumulating device defines adjacent accumulating units.

12. The system as defined in claim 11, wherein at least one of said accumulating unit comprises a removable container; and wherein said mail items are loaded into said container and are removed by removing said container from said accumulating unit.

13. The system as defined in claim 12, wherein at least one said accumulating units comprises a removable cartridge, said cartridge enabling orderly arrangement of said mail items deposited successively inside said cartridge and enabling subsequent orderly removal of said mail items from said cartridge.

14. The system as defined in claim 1, further comprising an intermediate parking area for parking trucks not engaged in sorting and sequencing operations; said intermediate parking area comprising an auxiliary conveyor system interfaceable with said first conveyor system and defining an endless closed-loop path, which communicates with said path by means of switches.

15. The system as defined in claim 3, wherein each of said DPP units communicates with an unloading system for feeding groups of said mail items and removing from said accumulating device out of said DPP unit.

16. The system as defined in claim 1, further comprising an electronic control unit (CPU) which controls operations performed by said at least one DPP unit to control performance of successive sorting and sequencing steps.

17. A mail sorting system comprising a first conveyor system comprising a number of trucks travelling along a path;

at least one feed unit communicating with said first conveyor system, said feed unit receiving said mail items and loading said mail items into said trucks; and at least one accumulating device cooperating with said first conveyor system to receive said mail items released by said trucks;

said accumulating device being located beneath an unloading portion of said path of said first conveyor system;

one of said trucks engages said unloading portion to run over said accumulating device; and said one truck has an unloading mechanism enabling release of said mail items from said one of said trucks and enabling said mail items to fall by force of gravity into said accumulating device; wherein each of said trucks defines a number of pockets each of which communicates externally of said truck through at least one loading opening and is bounded thereof by an unloading hatch movable between a closed position and an open position enabling said mail items to slide by force of gravity out of said pockets.

18. The system as defined in claim 17, wherein said accumulating device comprises a second conveyor system located beneath an unloading portion of said path of said first conveyor system.

19. A mail sorting and sequencing system, comprising at least one DPP unit for forming groups of mail items and for sorting and sequencing mail items; each DPP unit comprising:

a conveyor system comprising a number of trucks travelling along a path;

at least one feed unit communicating with said conveyor system, said feed unit receiving said mail items and loading said mail items into said trucks;

at least one accumulating device cooperating with said conveyor system to receive said mail items released by said trucks;

switches located along said path for allowing formed/forming trains to travel along said path, each train being characterized by a first parameter n representing the progressive location of a batch of mail items along a delivery route; and first control means activated by the arrival of two trains at the same switch, said first control means comparing said first parameters n of said two trains to activate said switch to let through said batch of mail items having the lower progressive location along said delivery route; wherein each of said trucks defines a number of pockets each of which communicates externally of said truck through at least one loading opening and is bounded thereof by an unloading hatch movable between a closed position and an open position enabling said mail items to slide by force of gravity out of said pockets.

20. The system as defined in claim 19, wherein said mail items (7) include:

a first type of mail comprising letters and postcards (REGULAR MAIL);

a second type of mail comprising FLAT mail items of dimensions larger than the corresponding dimensions of letters and postcards; and a third type of mail comprising OVERSIZED mail items whose characteristic dimensions make automated processing of said items difficult; and wherein each train being also characterized by a second parameter m representing the type of mail items forming said batch;

said mail sorting and sequencing system further comprising second control means which are selected when said two trains have said first parameters n of the same value; said second control means compare said second parameters m of said two trains to activate said switch to let through said batch of mail items having the lower second parameter.

* * * * *

UNITED STATES PATENT AND TRADEMARK OFFICE

CERTIFICATE OF CORRECTION

PATENT NO. : 7,728,244 B2
APPLICATION NO. : 11/755979
DATED : June 1, 2010
INVENTOR(S) : Guido De Leo and Cristiano Franzone It is certified that error appears in the above-identified patent and that said Letters Patent is hereby corrected as shown below:

Title page, item [30], the foreign priority should be listed as Italian application TO2003A000577 filed July 25, 2003.

Signed and Sealed this

Twenty-sixth Day of October, 2010

David J. Kappos

*Director of the United States Patent and Trademark Office*